Figure 1:
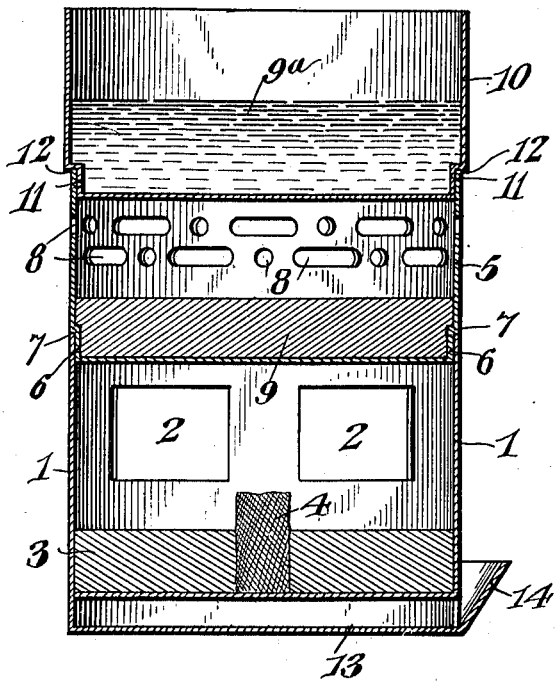

J. W. & C. A. SCOTT.
C. A. SCOTT, ADMINISTRATOR OF J. W. SCOTT, DEC'D.
APPARATUS FOR FUMIGATING.
APPLICATION FILED AUG. 29, 1911.

1,021,270.

Patented Mar. 26, 1912.

Witnesses
Jas. K. McCathran
F. T. Chapman

James W. Scott, Inventors
Charles A. Scott,
By
E. G. Siggers
Attorney

UNITED STATES PATENT OFFICE.

JAMES W. SCOTT AND CHARLES A. SCOTT, OF KOKOMO, INDIANA; CHARLES A. SCOTT ADMINISTRATOR OF SAID JAMES W. SCOTT, DECEASED.

APPARATUS FOR FUMIGATING.

1,021,270.      Specification of Letters Patent.      Patented Mar. 26, 1912.

Application filed August 29, 1911. Serial No. 646,749.

*To all whom it may concern:*

Be it known that we, JAMES W. SCOTT and CHARLES A. SCOTT, citizens of the United States, residing at Kokomo, in the county of Howard and State of Indiana, have invented a new and useful Apparatus for Fumigating, of which the following is a specification.

This invention has reference to improvements in apparatus for fumigating, and its object is to provide a simple and efficient fumigating apparatus which may be readily transported without danger of fumes of a disinfectant escaping from the apparatus when not in use.

In accordance with the present invention there is provided a device comprising a heating chamber containing a substance capable of being lighted and thereby constituting a source of heat, another chamber arranged to be in part seated or nested in the first named chamber and containing a mass of suitable fumigating material, the second chamber having perforations or passages through its walls for the escape of the disinfectant in a gaseous form due to the action of the heating chamber, and a third chamber adapted to in part enter or nest in the fumigating chamber, the third chamber being designed to receive water and freely open at one end, so that the water in the form of vapor or steam may readily escape to the atmosphere. The water carrying chamber is so arranged that it may be inverted and then be applied to the disinfectant holding chamber in a manner to close all openings therein, so that the disinfectant may not escape when the parts are assembled for transportation.

The invention will be best understood from a consideration of the following detailed description, taken in connection with the accompanying drawings forming a part of this specification, with the understanding, however, that while in the drawings there is shown a practical form of the invention, it is not confined to any exact conformity with the particular arrangement shown and described, but may be variously modified so long as the salient features of the invention are retained.

Figure 2:
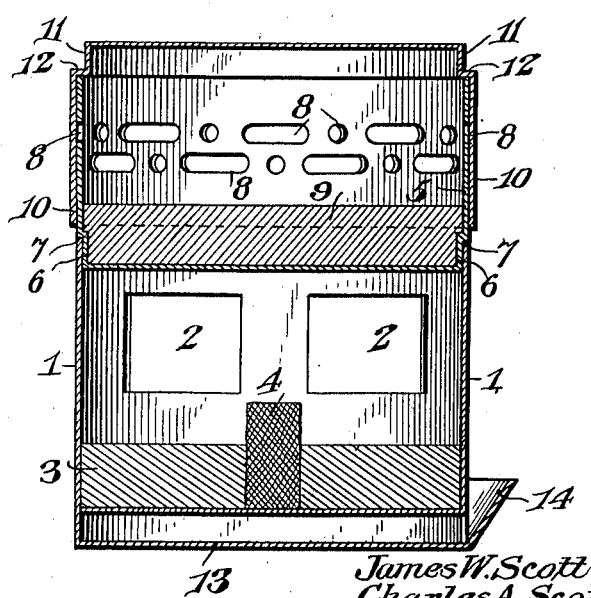

In the drawings:—Figure 1 is a central section through the device with the parts in position for use. Fig. 2 is a like section with the parts assembled for transportation.

Referring to the drawings, there is shown a heating member 1 comprising a preferably cylindrical structure closed at one end and open at the other and of practically the same diameter throughout, the walls of this chamber or compartment having openings 2 therethrough between the two ends of the member. At the closed end of the member or chamber 1 and interior thereto there is provided a mass 3 of some suitable material, such as paraffin or other substance capable when heated of feeding a wick 4 which may be lighted, and thereby produce a flame of sufficient intensity to supply the necessary heat for the purposes of the present invention. For convenience of description, the mass 3 with its wick 4 will be termed a candle, but it will be understood that this term may be taken as indicative of any heating means for the purpose.

Adapted to the open end of the chamber or member 1 is another member 5 of similar contour, having a closed end 6 reduced in diameter so as to fit in the open end of the member 1, with ledges 7 adapted to rest on the walls of the member 1, at its open end, while the main portion of the walls of the member 5 are flush with the walls of the member 1. The member 5, like the member 1, may be cylindrical and is provided near its open end with a circular series of perforations or passages 8, while lodged in the closed end of the receptacle or chamber 5 is a mass 9 of suitable fumigating material, of which formaldehyde may constitute the active fumigating agent. It is to be preferred that the mass 9 be solid at ordinary temperatures, so that the device may be transported from place to place without danger of spilling the disinfectant compound, but such compound will readily liquefy and vaporize under the heat due to the action of a candle 3.

Adapted to the open end of the member or compartment 5 there is a cup-like member 10, generally similar to the member 5, which is also cup-like in shape, and like the members 5 and 1, the member 10 may be cylindrical. The member 10 is closed at one end and is there contracted in diameter, as indicated at 11, so as to enter for a distance into the open end of the member 5, and where the contracted portion and the main portion of the member 10 join, there are formed shoulders 12 adapted to rest on the walls of the member 5 at the open end thereof. The member 10, however, is in its body portion of greater internal diameter than the member 5, so that the member 5 will enter the open end of the member 10 up to the contracted portion 11 and the larger portion of the member 10 is of sufficient length to wholly close the openings 8 when in position to act as a cap for the member 5, the last named position of the parts being illustrated in Fig. 2, where it will be seen that the openings 8 are all closed by the walls of the member 5 and that the open end of the member 5 is closed by the contracted end 11 of the member 10, wherefore any gases escaping from the compound 9 will have no means of exit from the interior of the member 5, so long as the member 10 is in inclosing relation thereto.

When the parts are in position for operation, the member 1 is placed upon some means of support in an approximately horizontal position, so that the member 1 stands about upright with the member 5 resting on the upper end of the member 1 and the contracted end thereof nesting in the open end of the member 1, while the member 10 is placed upon the open end of the member 5, so as to close the same by the entrance of the contracted end 11 into nesting relation with the open end of the member 5, and then water indicated at 9ᵃ in Fig. 1 may be placed within the member 10, after which the wick 4 is lighted and the flame thereof will serve to heat the mass 9, driving off in the form of gas or vapor the formaldehyde or other such disinfectant which will escape through the openings 8 and being then in a heated condition will rise around the outer walls of the member 10. As the apparatus continues in operation, the heat developed is sufficient to vaporize the water 9ᵃ and this will escape through the open end of the cup like member 10 in the form of vapor or steam, mingling with the rising gases of disinfectant escaping through the openings 8, so that there is produced a steam like mass containing an appropriate amount of disinfectant and this mass being considerably heated will rise and spread through a room conveying the disinfectant to all parts of the room, and because of the moist nature of the mixture, it is in the best condition for action as a germicide. Air for the flame of the burning wick 4 finds its way through the openings 2 and the products of combustion also find their way from the interior of the member 1 to the outer air through the openings 2 to mingle with and heat the disinfectant passing through the openings 8 and the watery vapor rising from the open end of the member 10.

When the device is assembled as in Fig. 2 for shipment or storage, it is customary to seal the edges of the member 10 where inclosing the member 5 with wax or some such preparation, which will more effectively prevent the escape of any of the formaldehyde vapor or gas, and while formaldehyde has been mentioned as the preferred form of disinfectant or germicide, it may be stated that any other suitable disinfectant may be employed. In practical operation the formula to be used should consist of tallow, glycerin and paraformaldehyde, the percentage of the ingredients being determined by the space to be disinfected.

The bottom of the whole burner has a small space 13 under the fire to contain water, which may be introduced through a lip 14, so that the water will be underneath the burner to prevent the apparatus from becoming hot and burning anything it is placed upon.

What is claimed is:—

1. An apparatus for fumigating, comprising a heating chamber, a chamber for the reception of a disinfectant provided with outlets for the discharge of vapor or gas and adapted to rest on and be supported by the heating chamber, and a chamber for the reception of water adapted to rest on and be supported by the chamber for the disinfectant, the water chamber being of a size to serve as a cover and closure for the disinfectant chamber and its outlets when inverted and applied thereto.

2. An apparatus for fumigating comprising a chamber having one end open and adapted to receive a heating element, another chamber adapted to rest on and having a closed end of a size to nest in the open end of the heating chamber, said second chamber being adapted to receive a disinfectant and provided with a series of perforations between the ends of the chamber, and a third chamber having one end closed and contracted to rest on and nest in the open end of the disinfectant chamber, said third named chamber being of a size and length to inclose the perforated portion of the second named chamber when inverted thereover and applied thereto.

3. An apparatus for fumigating, comprising a substantially cylindrical chamber closed at one end and open at the other and provided with intermediate passages through its walls, said chamber being adapted to receive a heating element, another substantially cylindrical chamber open at one end and at the other end contracted in diameter and closed and of a size to have its contracted end nest in the open end of the first chamber with the second chamber resting on the walls of the first chamber, said second chamber being adapted to receive disinfectant and having a series of perforations through its walls between the open end and the portion designed to receive the disinfectant, and a third chamber of substantially cylindrical form with one end closed and contracted in diameter, said third chamber having its main portion of a greater diameter than the diameter of the main portion of the second chamber, said third chamber having its contracted portion of a diameter to nest in the open end of the second chamber and to contain water, said third chamber being adapted when inverted to inclose the open end and perforated portion of the second chamber.

In testimony that we claim the foregoing as our own, we have hereto affixed our signatures in the presence of two witnesses.

JAMES W. SCOTT.
CHARLES A. SCOTT.

Witnesses:
J. F. MOMSON,
MABEL LARMORE.

Copies of this patent may be obtained for five cents each, by addressing the "Commissioner of Patents, Washington, D. C."